(12) United States Patent  
Park

(10) Patent No.: US 7,583,987 B2  
(45) Date of Patent: Sep. 1, 2009

(54) PORTABLE TERMINAL

(75) Inventor: Hyo-Sung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 11/652,020

(22) Filed: Jan. 11, 2007

(65) Prior Publication Data

US 2007/0167045 A1 Jul. 19, 2007

(30) Foreign Application Priority Data

Jan. 13, 2006 (KR) ................... 10-2006-0004126

(51) Int. Cl.  
*H04B 1/38* (2006.01)

(52) U.S. Cl. ................... 455/575.1; 361/679.01; 361/679.3

(58) Field of Classification Search ........... 361/683; 455/575.1  
See application file for complete search history.

(56) References Cited

U.S. PATENT DOCUMENTS

| | | | | |
|---|---|---|---|---|
| 5,608,863 | A | * | 3/1997 | Ishizawa et al. ............. 345/501 |
| 6,519,483 | B1 | | 2/2003 | Watanabe et al. |
| 6,643,124 | B1 | * | 11/2003 | Wilk .......................... 361/681 |
| 6,747,635 | B2 | * | 6/2004 | Ossia ......................... 345/169 |
| 7,047,053 | B2 | * | 5/2006 | Lee .......................... 455/575.3 |
| 7,149,557 | B2 | * | 12/2006 | Chadha ................... 455/575.1 |
| 7,409,236 | B1 | * | 8/2008 | Luna et al. ............... 455/575.1 |
| 2004/0229662 | A1 | | 11/2004 | Chadha |
| 2005/0276412 | A1 | | 12/2005 | Kfoury |

FOREIGN PATENT DOCUMENTS

| | | |
|---|---|---|
| EP | 1220517 A1 | 7/2002 |
| JP | 2002-207971 A | 7/2002 |

\* cited by examiner

*Primary Examiner*—Lisa Lea-Edmonds  
(74) *Attorney, Agent, or Firm*—Birch, Stewart, Kolasch & Birch, LLP

(57) ABSTRACT

A portable terminal including a first body having an exit portion at one side thereof and an accommodating part in an inside thereof, and a second body having a display mounted thereon being accommodated in the accommodating part and drawn out of the first body through the exit portion.

18 Claims, 5 Drawing Sheets

PORTABLE TERMINAL

CROSS REFERENCE TO A RELATED APPLICATION

The present application claims priority to Korean Application No. 10-2006-004126, filed in Korea on Jan. 13, 2006, which is herein incorporated by reference in its entirety.

BACKGROUND OF THE INVENTION

1. Field of the Invention

The present invention relates to a portable terminal, in which a first body accommodates a second body having a display such that the second body can be drawn in and out of the first body.

2. Description of the Background Art

Turning first to FIG. 1, which is a related art perspective view of a portable terminal. As shown, the related art terminal includes a folder 108 having displays 102 and 104 displaying information, a speaker 106 and a main body 116 rotatably connected to the folder 108. The main body 116 includes a key pad 110 mounted at a front side, a microphone 112, and a battery 114 mounted at a rear side. Also included is a hinge connecting part 120 interposed between the upper end of the main body 116 and a lower end of the folder 108 such that the main body 116 and the folder 108 can rotate.

Further, the main display 102 is mounted at an inner side of the folder 108 and is exposed when the folder 108 is unfolded. The sub display 104 is mounted at an outer side of the folder 108 and displays information when the folder 108 is closed.

However, the related art portable terminal requires two displays (the sub display 104 and main display 102) to display information when the folder is closed. Thus, the related art terminal is more expensive to manufacture. In addition, because the sub display 104 is always exposed, the sub display 104 is often damaged.

SUMMARY OF THE INVENTION

Accordingly, one object of the present invention is to address the above-noted and other problems.

Another object the present invention is to provide a portable terminal that protects a display unit from an external impact.

Yet another object of the present invention is to provide a portable terminal that is less expensive to manufacture by using a single display and transparent window so that a user can see information displayed on the display through the transparent window even when the display is accommodated inside the main body of the terminal.

Still yet another object of the present invention is to provide a portable terminal that is aesthetically pleasing and easy to use.

To achieve these and other advantages and in accordance with the purpose of the present invention, as embodied and broadly described herein, the present invention provides in one aspect a portable terminal including a first body having an exit portion at one side and an accommodating part inside, and a second body having a display. The second body is accommodated in the accommodating part and drawn out of the first body through the exit portion.

In another aspect, the present invention provides a method of manufacturing a portable terminal. The method includes forming a first body having an exit portion at one side thereof, an accommodating part in an inside thereof, and a transparent window on an outside surface thereof, forming a second body having a display, and mounting the second body in an accommodating portion within the first body via a hinge unit such that the second body can be drawn out of the first body through the exit portion. Further, the transparent window is disposed at a position on the outside of the first body that corresponds with at least a portion of the display of the second body when the second body is in a closed state within the accommodation portion of the first body such that a user can view the portion of the display of the second body through the transparent window when the second body is in the closed state.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
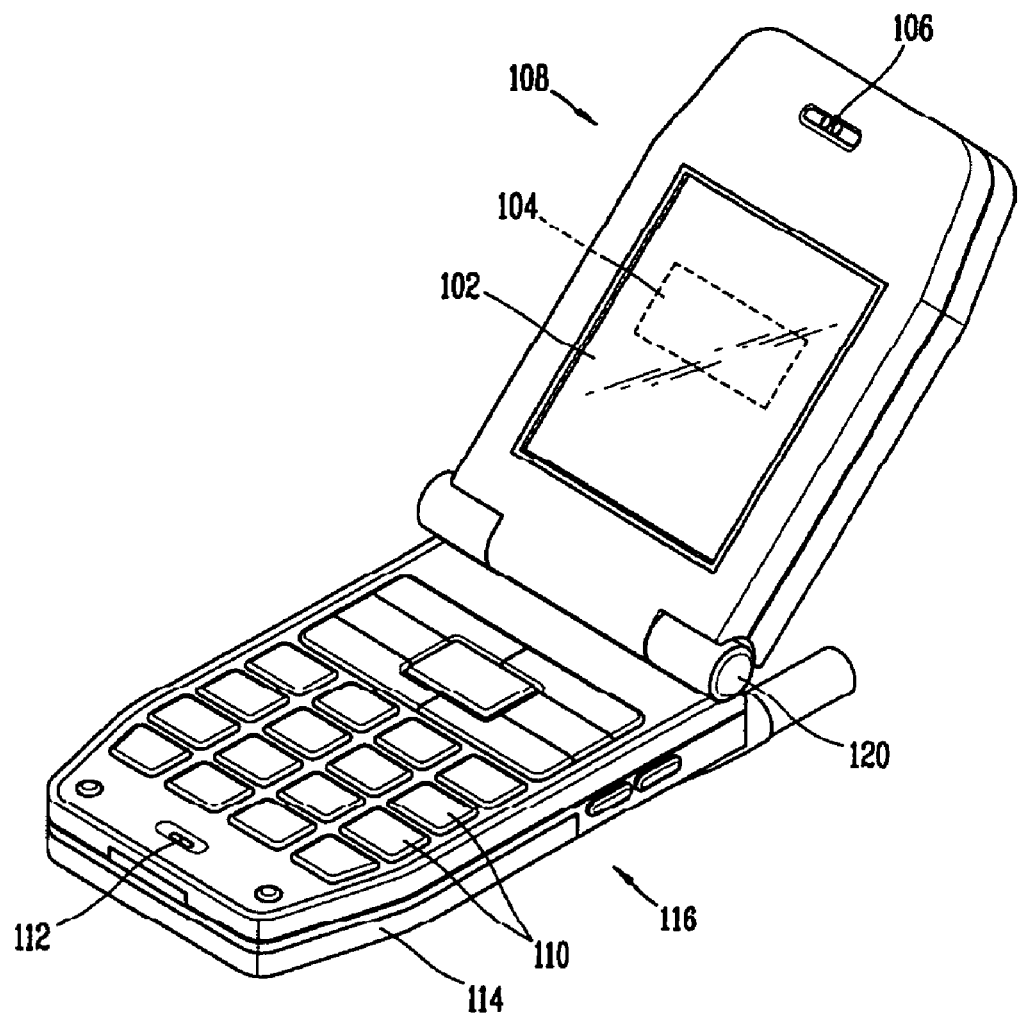
FIG. 1 is a perspective view of a related art portable terminal.
Figure 2:
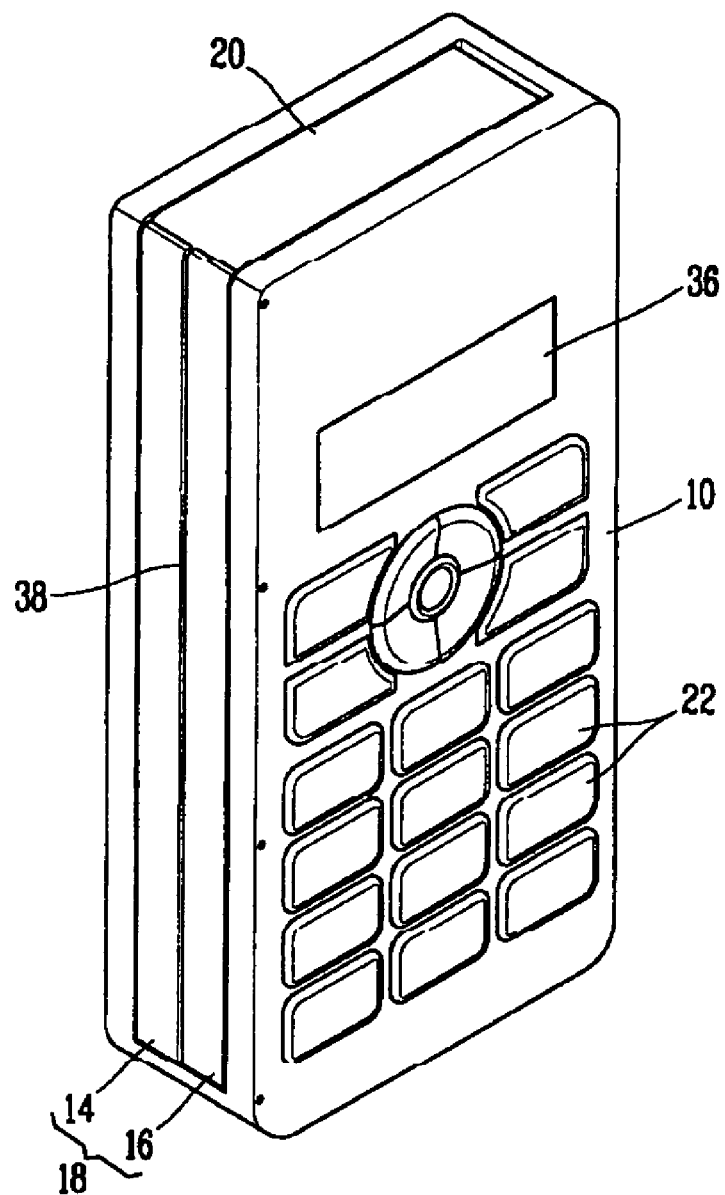
FIG. 2 is a perspective view illustrating a portable terminal according to an embodiment of the present invention when the portable terminal is closed.

Turning first to FIG. 2, which is a perspective view illustrating a portable terminal according to an embodiment of the present invention when the portable terminal is closed. As shown, the portable terminal includes a first body 10 and a second body 20 rotatably connected to the first body 10. Further, the first body 10 has an exit portion 38 formed at one side in a length direction so that the second body 20 can be drawn out of the first body 10, and has an open upper side through which the second body 20 can be drawn out.

Figure 3:
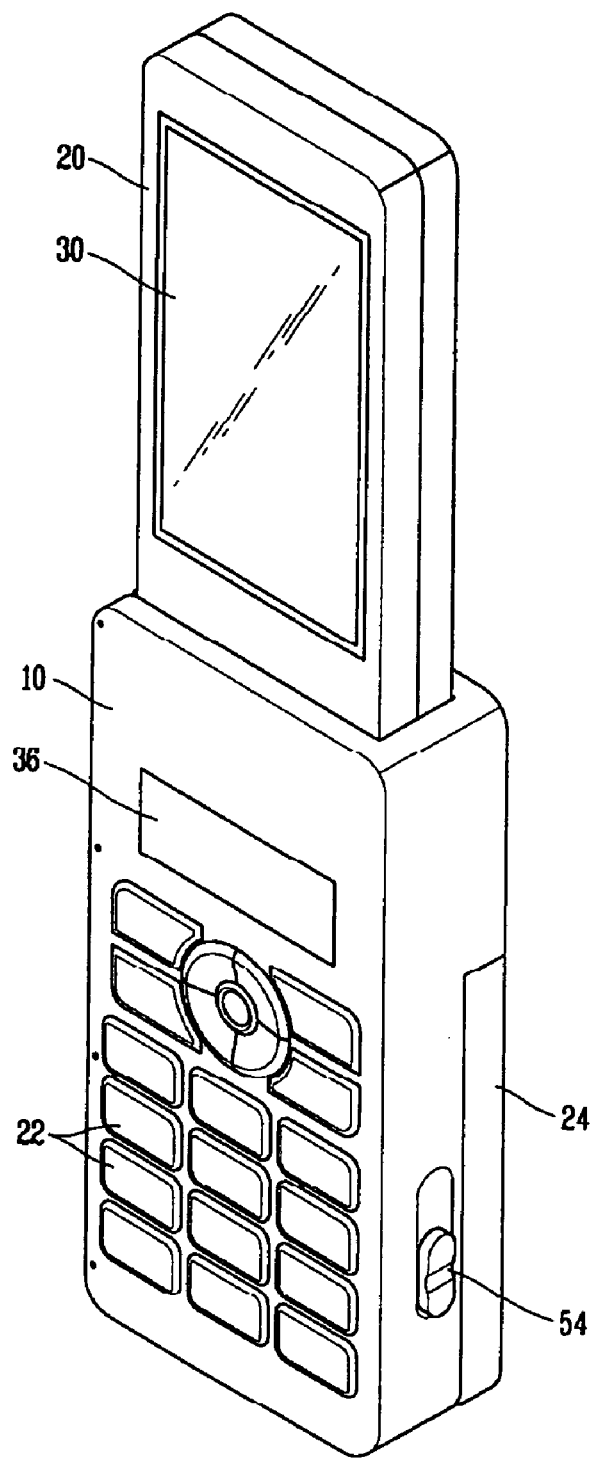
FIG. 3 is a perspective view illustrating the portable terminal according to an embodiment of the present invention when the portable terminal is opened.

Also, a door 18 is disposed at the exit portion 38 to open and close the exit portion 38 and to prevent dust and other exterior materials from entering the first body 10. As shown in FIG. 2, the open upper side of the first body 10 is shut by one side of the second body 20 when the second body 20 is accommodated in the first body 10, thus preventing dust and exterior materials from entering the first body 10. Further, FIG. 2 illustrates the terminal in a closed state and FIG. 3 illustrates the terminal in an opened state. FIG. 3 also illustrates the first body 10 including a battery 24 and an operating button 54 for opening the second display 20.

In addition, as shown in FIG. 2, the door 18 can be opened in two directions by a pushing force, and includes a first door 14 and a second door 16 connected to the exit portion 38 in the length direction by a corresponding hinge. Further, a spring is disposed on a hinge shaft of the first and second doors 14 and 16 so as to apply an elastic force to the first and second doors 14, 16 in a direction to close the exit portion 38.

The first body 10 also has a key pad 22 exposed at its front side for inputting information. In addition, the first body 10 has a transparent window 36 at the front side such that a user can see through the transparent window any information displayed on a display 30 (see FIG. 3) mounted on the second body 20, when the second body 20 is accommodated in an accommodating part 12 (see FIG. 4) of the first body 10.

As shown in FIG. 3, the second body 20 includes the display 30 for displaying information. In addition, the display 30 has a wide screen over the front side of the second body 20, and thus information can be partially displayed on a portion which a user can see through the transparent window 36 when the second body 20 is accommodated in the accommodating part 12 of the first body 10.

Figure 4:
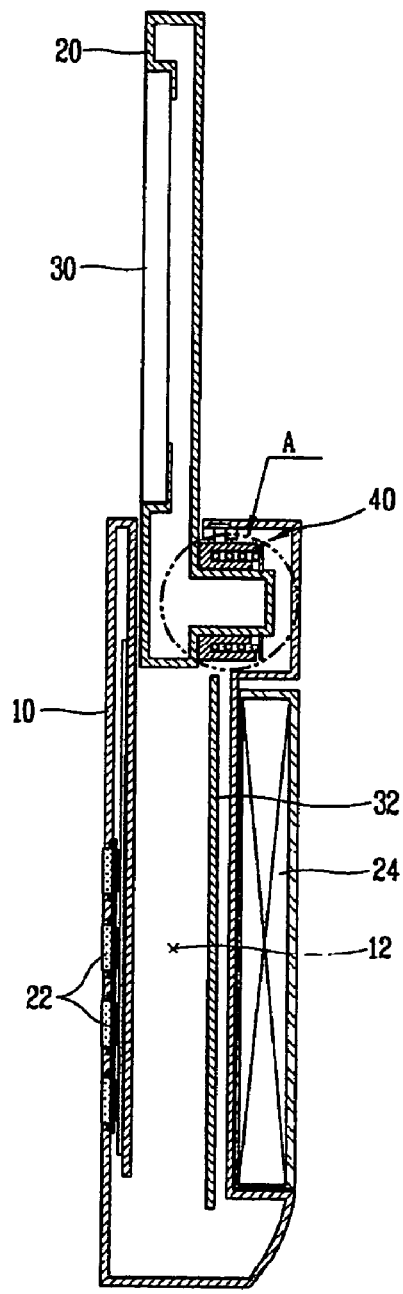
FIG. 4 is a cross-sectional view illustrating the portable terminal according to an embodiment of the present invention.

In addition, as shown in the cross-sectional view of FIG. 4, the terminal also includes a hinge connecting part 40 interposed between the first and second bodies 10 and 20 to rotatably support the second body 20. Thus, when the second body 20 is drawn out of the first body 10 via the hinge connecting part 40, the second body 20 rotates by 180 degrees to be located at the upper side of the first body 10. FIG. 4 also illustrates a printed circuit board 32 including electrical components used to operate the terminal.

Figure 5:
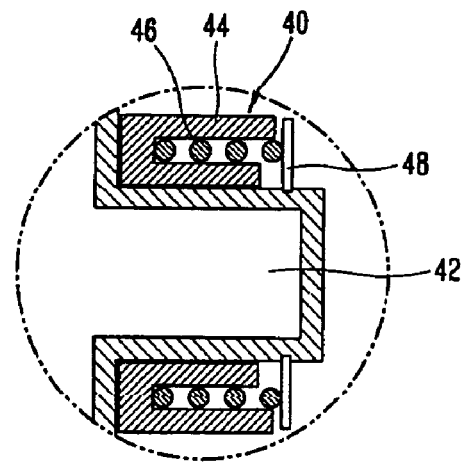
FIG. 5 is an enlarged view of a portion A in FIG. 4.

Next, FIG. 5 illustrates an enlarged portion A of the hinge connecting part 40 in FIG. 4. As shown in FIG. 5, the hinge connecting part 40 includes a hinge shaft 42 protruding at a right angle from a side surface of one end portion of the second body 20, and a hinge housing 44 formed at one side of the first body 10 to rotatably support the hinge shaft 42.

Further, the hinge shaft 42 is formed to protrude at a right angle from the center of the rear side of the second body 20 such that the second body 20 can rotate in a lateral direction with respect to the first body 10, and the hinge housing 44 is formed in a cylindrical shape at an upper inner side of the first body 10 in a thickness direction of the first body 100. Further, a snap ring 48 is mounted at an end portion of the hinge shaft 42 to prevent the hinge shaft 42 from separating from the hinge housing 44.

Also, an elastic member 46 is disposed at an outer periphery of the hinge housing 44 so as to apply an elastic force to the second body 20 in a direction to open. In other words, the elastic member 46 is formed of a coil spring and wound around the outer periphery of the hinge housing 44, and one end of the elastic member 46 is fixed to the hinge housing 44 and the other end is fixed to the hinge shaft 42 to apply a rotating force to the hinge shaft 42.

Figure 6:
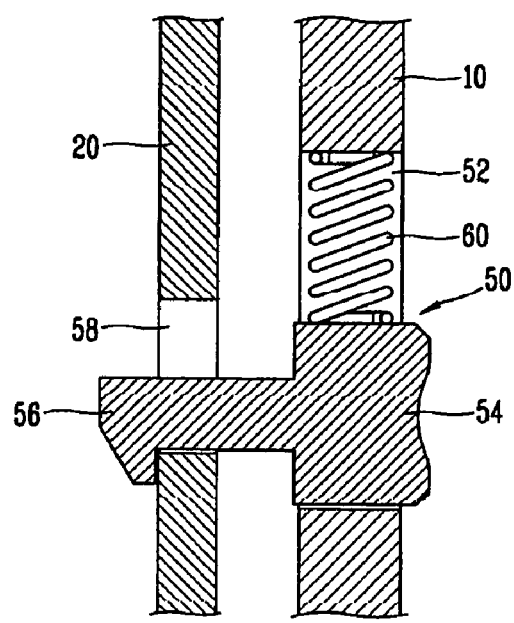
FIG. 6 is a cross-sectional view illustrating a locking unit of the portable terminal according to an embodiment of the present invention.

In addition, as shown in FIG. 6, to keep the second body 20 accommodated in the first body 10, a locking unit 50 is disposed between the first and the second bodies 10 and 20. In more detail, and as shown in FIG. 6, the locking unit 50 includes the operation button 54 linearly movable in a guide hole 52 formed at the side of the first body 10, and a locking hook 56 integrally formed with the operation button 54. Further, an engaging hole 58 is formed at a side of the second body 20 so as to be engaged with the locking hook 56, and a return spring 60 is disposed between the operation button 54 and the inner surface of the guide hole 52 to return the operation button 54 to an initial position.

An operation of the portable terminal according to an embodiment of the present invention will now be discussed with reference to FIGS. 2-6.

First, when the second body 20 is accommodated in the accommodating part 12 of the first body 10, the locking hook 56 is engaged with the locking hole 58 to keep the second body 20 accommodated in the first body 10. In this state, a user can see the display 30 mounted on the second body 20 through the transparent window 36 mounted on the first body 10. In addition, in this state, information can be displayed exclusively on a portion of the display 30 that can be seen by the user through the transparent window 36.

Further, the door 18 is disposed at the exit portion 38 formed in the first body 10 to allow the second body 20 to be drawn in and out through the exit portion 38. Thus, the door 18 prevents exterior materials from entering the first body 10. Also, when the terminal is in a closed state, the user can open the terminal by pressing the operation button 54. That is, when the user presses the operation button 54, the locking hook 56 is separated from the locking hole 58 and the second body 20 is thus released in the lateral direction by an elastic force of the elastic member 60.

Therefore, when the door 18 mounted at the first body 10 is pushed, the door 18 is opened and the second body 20 is drawn out of the accommodating part 12 of the first body 10 so as to be located at the upper side of the first body 10. That is, the elastic member 46 is compressed at the hinge shaft 42 and released when the second body 20 is released and then rotates the hinge shaft 42. Then, the second body 20 that is connected to the hinge shaft 42 rotates so as to be drawn out of the first body 10.

The terminal may also be manufactured without a door such that the second body 20 automatically rotates to an opened state when the operation button 54 is pressed. For example, a side of the second body 20 may be made flush with the first body 10 to prevent dust, etc. from entering the first body 10.

Therefore, in the portable terminal according to an embodiment the present invention, the second body 20 having the display 30 is disposed so as to be accommodated in the accommodating part 12 of the first body 10, so that no portion of the display 30 is exposed to the outside. Therefore, it is possible to prevent the display 30 from being damaged by an external impact.

In addition, the second body 20 is kept accommodated in the first body 10 and then rotates in the lateral direction of the first body 10 when the second body 20 is released so as to be drawn out of the accommodating part 12. Thus, the terminal is compact and is aesthetically pleasing.

Further, because a user can see through the transparent window 36 formed in the first body 10 the information that is displayed on the display 30 mounted in the second body 20 when the second body 20 is accommodated in the first body 10, the terminal requires only one display. Thus, the present invention reduces the cost of manufacturing a terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
a first body having an exit portion at one side thereof and an accommodating part in an inside thereof;
a second body having a display mounted thereon being accommodated in the accommodating part and drawn out of the first body through the exit portion; and
a hinge connecting part rotatably connecting the first and second bodies,
wherein the hinge connecting part includes a hinge shaft protruding at a right angle from one side surface of the second body, and a hinge housing formed at one side of the first body to rotatably support the hinge shaft, and
wherein the hinge connecting part further includes an elastic member configured to apply an elastic force to the second body in a direction to open the second body.

2. The portable terminal of claim 1, further comprising:
a key pad configured to input information and being mounted to a front side of the first body; and
a battery mounted to a rear side of the first body.

3. The portable terminal of claim 1, wherein the first body further comprises a transparent window through which a portion of the display mounted on the second body can be seen when the second body is accommodated in the accommodating part.

4. The portable terminal of claim 3, wherein information is displayed exclusively on the portion of the display that can be seen through the transparent window when the second body is accommodated in the first body.

5. The portable terminal of claim 1, further comprising:
an operating button configured to release the hinge connecting part such that the second body is drawn out in a lateral direction of the first body.

6. The portable terminal of claim 5, wherein the hinge connecting part is configured to allow the second body be drawn out in the lateral direction of the first body and rotated by 180 degrees to be parallel with the first body.

7. The portable terminal of claim 1, wherein the accommodating part on the inside of the first body includes an open upper side portion of the first body that is closed by one corresponding side of the second body when the second body is accommodated in the accommodating part of the first body.

8. The portable terminal of claim 1, further comprising:
a locking unit disposed between the first and second bodies and configured to lock the first and second bodies together when the second body is accommodated in the accommodating part of the first body.

9. The portable terminal of claim 8, wherein the locking unit comprises:
a locking hole formed at a side of the second body;
an operation button disposed to be slidably movable along a guide hole formed at the side of the first body; and
a locking hook moved with the operation button and engaged with the locking hole.

10. A portable terminal, comprising:
a first body having an exit portion at one side thereof and an accommodating part in an inside thereof;
a second body having a display mounted thereon being accommodated in the accommodating part and drawn out of the first body through the exit portion; and
a door mounted at the exit portion of the first body and configured to cover and close the exit portion.

11. The portable terminal of claim 10, wherein the door comprises first and second swinging doors configured to be swung open when pushed such that the second body is drawn out from the first body.

12. A portable terminal, comprising:
a first body having an exit portion at one side thereof and an accommodating part in an inside thereof;
a second body having a display mounted thereon being accommodated in the accommodating part and drawn out of the first body through the exit portion; and
a locking unit disposed between the first and second bodies and configured to lock the first and second bodies together when the second body is accommodated in the accommodating part of the first body,
wherein the locking unit comprises:
a locking hole formed at a side of the second body;
an operation button disposed to be slidably movable along a guide hole formed at the side of the first body; and
a locking hook moved with the operation button and engaged with the locking hole, and
wherein the portable terminal further comprises a return spring disposed at a side of the operation button and configured to return the operation button to an initial position.

13. A method of manufacturing a portable terminal, the method comprising:
forming a first body having an exit portion at one side thereof, an accommodating part in an inside thereof, and a transparent window on an outside surface thereof;
forming a second body having a display; and
mounting the second body in an accommodating portion within the first body via a hinge unit such that the second body can be drawn out of the first body through the exit portion,
wherein the transparent window is disposed at a position on the outside of the first body that corresponds with at least a portion of the display of the second body when the second body is in a closed state within the accommodation portion of the first body such that a user can view the portion of the display of the second body through the transparent window when the second body is in the closed state,
wherein the hinge unit includes a hinge shaft protruding at a right angle from one side surface of the second body, and a hinge housing formed at one side of the first body to rotatably support the hinge shaft, and
wherein the hinge unit further includes an elastic member configured to apply an elastic force to the second body in a direction to open the second body.

14. The method of claim 13, further comprising;
forming an operating button configured to release the hinge unit on the first body such that the second body is drawn out in a lateral direction of the first body when the operating button is pressed.

15. A method of manufacturing a portable terminal, the method comprising:
forming a first body having an exit portion at one side thereof, an accommodating part in an inside thereof, and a transparent window on an outside surface thereof;
forming a second body having a display;
mounting the second body in an accommodating portion within the first body via a hinge unit such that the second body can be drawn out of the first body through the exit portion, wherein the transparent window is disposed at a position on the outside of the first body that corresponds with at least a portion of the display of the second body when the second body is in a closed state within the accommodation portion of the first body such that a user can view the portion of the display of the second body through the transparent window when the second body is in the closed state; and forming a door at the exit portion of the first body and that covers and closes the exit portion, wherein the door comprises first and second swinging doors configured to be swung open when pushed such that the second body is drawn out from the first body.

16. A portable terminal, comprising:

a first body having an exit portion at one side thereof and an accommodating part in an inside thereof;

a second body having a display mounted thereon being accommodated in the accommodating part and drawn out of the first body through the exit portion; and a hinge connecting part rotatably connecting the first and second bodies, wherein the hinge connecting part is configured to allow the second body be drawn out in a lateral direction of the first body and rotated by 180 degrees to be parallel with the first body such that the second body has a longitudinal axis that substantially matches a longitudinal axis of the first body, wherein the hinge connecting part includes a hinge shaft protruding at a right angle from one side surface of the second body, and a hinge housing formed at one side of the first body to rotatably support the hinge shaft, and wherein the hinge connecting part further includes an elastic member configured to apply an elastic force to the second body in a direction to open the second body.

17. The portable terminal of claim 16, further comprising:

an operating button configured to release the hinge connecting part such that the second body is drawn out in the lateral direction of the first body.

18. A portable terminal, comprising:

a first body having an exit portion at one side thereof and an accommodating part in an inside thereof;

a second body having a display mounted thereon being accommodated in the accommodating part and drawn out of the first body through the exit portion;

a hinge connecting part rotatably connecting the first and second bodies, wherein the hinge connecting part is configured to allow the second body be drawn out in a lateral direction of the first body and rotated by 180 degrees to be parallel with the first body such that the second body has a longitudinal axis that substantially matches a longitudinal axis of the first body; and a door mounted at the exit portion of the first body and configured to cover and close the exit portion, wherein the door comprises first and second swinging doors configured to be swung open when pushed such that the second body is drawn out from the first body.

* * * * *